(No Model.) 2 Sheets—Sheet 1.

S. MANSFIELD.
DEVICE FOR HEATING TIRES.

No. 314,388. Patented Mar. 24, 1885.

Witnesses:
Walter E. Lombard
William H. Parry

Inventor:
Sylvester Mansfield,
by N. C. Lombard
Attorney.

(No Model.) 2 Sheets—Sheet 2.

S. MANSFIELD.
DEVICE FOR HEATING TIRES.

No. 314,388. Patented Mar. 24, 1885.

Witnesses:
Walter E. Lombard.
William H. Parry.

Inventor:
Sylvester Mansfield,
by N. C. Lombard
Attorney.

UNITED STATES PATENT OFFICE.

SYLVESTER MANSFIELD, OF LYNN, MASSACHUSETTS.

DEVICE FOR HEATING TIRES.

SPECIFICATION forming part of Letters Patent No. 314,383, dated March 24, 1885.

Application filed August 1, 1884. (No model.)

*To all whom it may concern:*

Be it known that I, SYLVESTER MANSFIELD, of Lynn, in the county of Essex and State of Massachusetts, have invented a new and useful Method of Expanding Carriage-Tires and Apparatus therefor, of which the following, taken in connection with the accompanying drawings, is a specification.

My invention relates to an improved method of and apparatus for applying heat to carriage-tires to expand them preparatory to setting them upon wheels; and it consists, first, in an oil-stove containing the following elements, viz: an oil-chamber, one or more wick-tubes, bearing-plates to receive and support a section of the tire, and a hood or cover to inclose and cover a section of the tire and concentrate the heat of the flame thereon.

It further consists in the employment of a series of portable oil-stoves arranged in a circle, and each provided with a removable hood arranged to inclose the flames from the burners and a section of the tire and to support said tire above the flame, as will be described.

It further consists in an oil-stove made in the form of a segment of a circle, and provided with two pairs of burners or wick-tubes, a hood having its ends of proper height to serve as supports for the tire and its curved sides extending above the top of the tire, in combination with a cover arranged to rest upon said curved sides and inclose a section of the tire.

Figure 2:
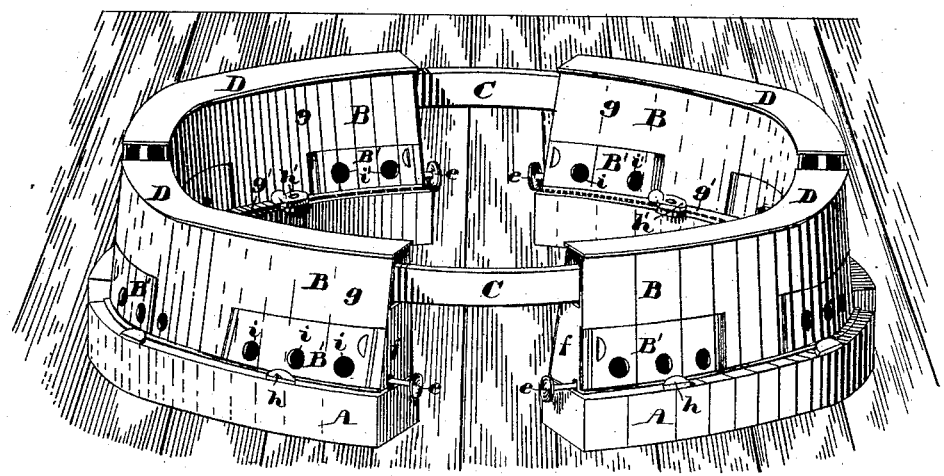
Figure 1:
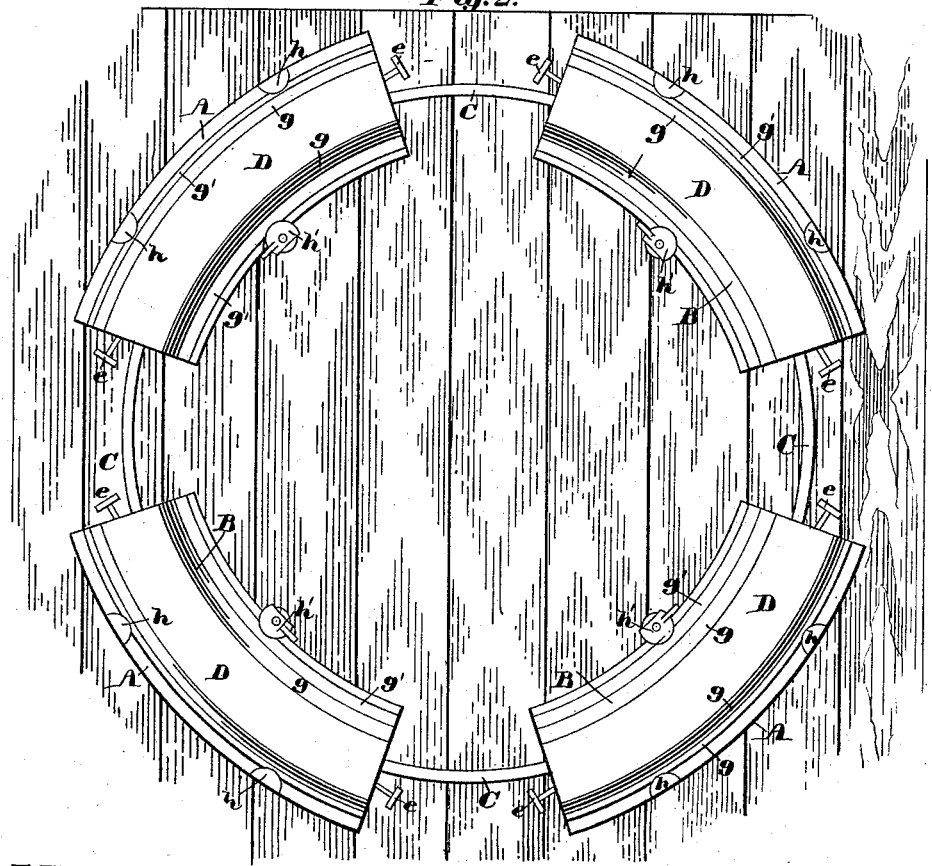
Figure 4:
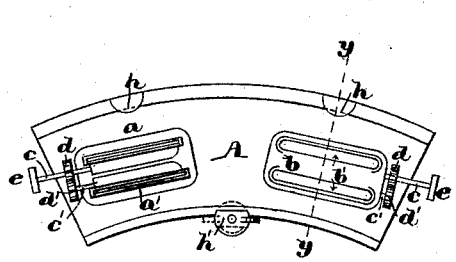
Figure 5:
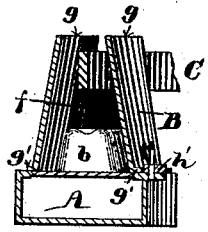
Figure 3:
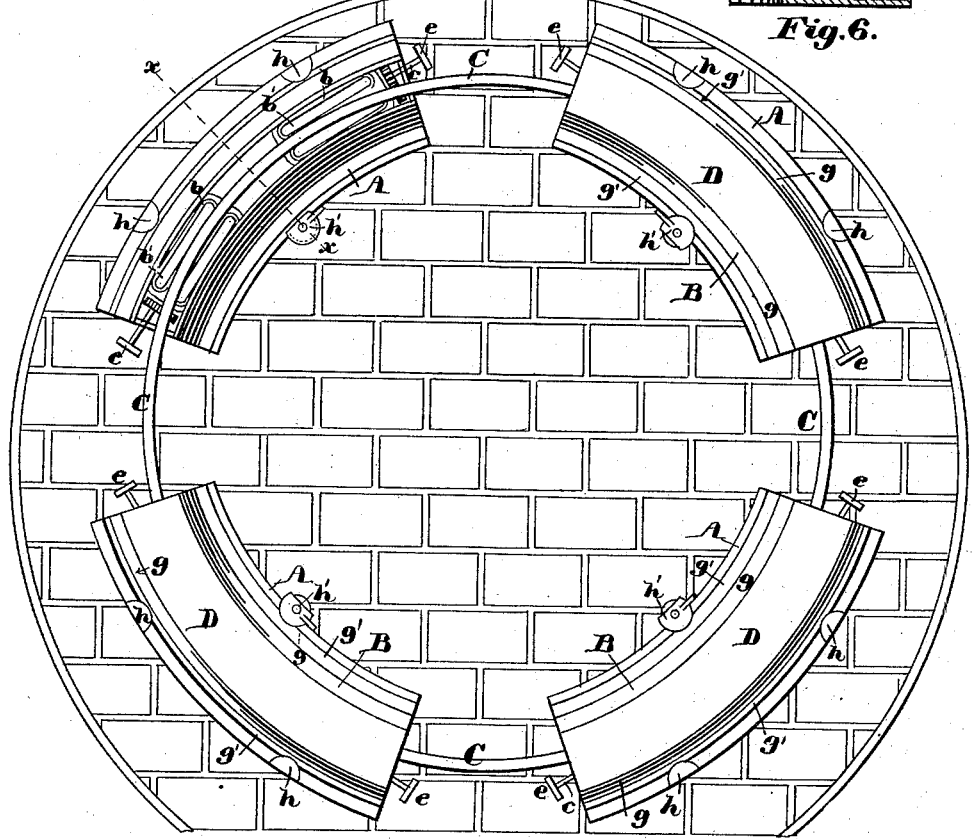

Figure 1 of the drawings is a plan of my improved apparatus arranged upon the wooden floor of a building with the tire in position therein. Fig. 2 is a perspective view of the same. Fig. 3 is a plan of the same apparatus arranged upon a brick floor with the tire in position and the top cover of one of the stoves removed. Fig. 4 is a plan of the lower or lamp section of the stove, the cover, hood, and one cone being removed. Fig. 5 is a transverse vertical section of a stove with the cover or top plate removed, the cutting plane being on line $x\ x$ on Fig. 3; and Fig. 6 is a similar section of the lower or lamp portion of the stove on line $y\ y$ on Fig. 4.

Figure 6:
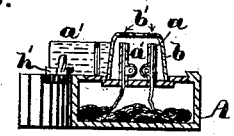

A is the lower or lamp portion of the oil-stove, made in the form of a segment of a circle as viewed in plan, and provided with two pairs of wick-tubes, $a\ a'$, and each pair of tubes being provided with a cone, $b$, having two slots, $b'\ b'$, as shown in Figs. 4 and 6. The wick-tube $a$ is provided with a wick-regulating shaft, $c$, and the tube $a'$ with a similar shaft, $c'$, said shafts $c$ and $c'$ being geared together by the gear-wheels $d$ and $d'$, the shaft $c$ being made considerably longer than the shaft $c'$ and projecting beyond the end of the stove A, and is provided with the button $e$, by which it may be revolved.

B is the hood, the ends $f$ of which are perpendicular and serve as supports upon which the tire C rests when being heated, and the sides $g\ g$ are curved to correspond to the curve of the body or lamp portion A, and extend upward above the top of the ends $f$ a distance at least equal to the greatest width of tire to be heated therein. The sides $g\ g$ are each provided with a flange, $g'$, one of which engages with the lugs $h\ h$, secured to the body A in fixed positions, and the other with the pivoted button $h'$, for the purpose of securing the hood B in position on said body. The sides $g\ g$ are inclined toward each other, as shown, so as to concentrate the flame upon the tire, and are provided with orifices $i$, for admission of air to the interior of the hood B to promote combustion, the amount of air so admitted being regulated by the damper-slides B', which are provided with corresponding orifices.

B is a plate-cover cut to the proper curve and arranged to rest upon the upper edges of the sides $g\ g$ of the hood B, as shown in Figs. 1, 2, and 3.

In carrying my invention into practice I take four or more of my improved oil-stoves and arrange them in a circle adapted to the size of the tire to be expanded upon the floor of the shop, as shown in Fig. 1; or, if desired, a brick floor or platform may be provided, as shown in Fig. 3. The wicks being lighted and the hoods B placed in position, the tire C is placed in position, resting upon the ends $f$ of the hoods B, and the covers D placed over the whole, as shown in Figs. 1 and 2. When the tire is sufficiently heated, it is removed, and another is placed in its position and is heated while the first one is being set.

The advantages of this method of heating tires and the apparatus for carrying it into effect are the portability of the apparatus and the facility with which it can be set in operation in almost any place and removed when the job is done, and also the fact that one tire may be heated while another is being set without requiring the special attention of the workman to look after the fire and keep up the supply of fuel.

What I claim as new, and desire to secure by Letters Patent of the United States, is—

1. An oil-stove for heating containing the following elements, viz: an oil-chamber, one or more wick-tubes, bearing-plates to receive and support a section of the tire, and a hood or cover to inclose and cover a section of the tire, substantially as described.

2. A series of portable oil-stoves or heaters arranged in a circle, and each provided with a removable hood adapted to inclose a section of the tire and support it above the flame, substantially as described.

3. An oil-stove for heating tires, made in the form of an arc of a circle and provided with one or more wick-tubes, in combination with a hood having its ends of suitable height to serve as supports for the tire and its curved sides extending above the top of said ends a distance equal to the width of the tire to be heated, and a covering-plate arranged to rest upon said curved sides and inclose a section of a tire, substantially as described.

In testimony whereof I have signed my name to this specification, in the presence of two subscribing witnesses, on this 28th day of July, A. D. 1884.

SYLVESTER MANSFIELD.

Witnesses:
  N. C. LOMBARD,
  WALTER E. LOMBARD.